INVENTOR
BERNARD M. GORDON
BY Joseph Weingarten
ATTORNEY

INVENTOR
BERNARD M. GORDON
BY Joseph Weingarten
ATTORNEY

Oct. 28, 1958 B. M. GORDON 2,858,425

DIGITAL DISCRIMINATOR

Filed Nov. 8, 1952 3 Sheets-Sheet 3

WAVEFORMS FOR Δf POSITIVE

INVENTOR
BERNARD M. GORDON
BY Joseph Weingarten
ATTORNEY

1

2,858,425

DIGITAL DISCRIMINATOR

Bernard M. Gordon, Concord, Mass., assignor to Laboratory For Electronics, Inc., Boston, Mass., a corporation of Delaware Application November 8, 1952, Serial No. 319,571

13 Claims. (Cl. 250—27)

The present invention relates in general to the interpretation of electrical data and more particularly to electronic apparatus for accurately indicating predetermined relationships between an input signal and an established reference through the utilization of highly dependable and economical digital techniques. From the discussion which follows, it will become apparent that the concepts disclosed are broadly applicable to signal sensing and detection; however, in view of the functional similarity between this invention and devices already known in the prior art, the present system will be referred to herein as a discriminator circuit.

Fundamentally, a discriminator is a circuit which provides an output signal having a selected characteristic variable to correspond with the departure of the frequency of an input signal from the frequency of a preset reference. In the discriminator almost universally adapted to frequency modulation detection, automatic frequency control, and the like, the reference is established by a sharply tuned resonant circuit, and the output as taken from rectifier and filter networks consists of a direct potential whose magnitude is proportional to frequency shift, within a comparatively small range of deviations, and whose sign is indicative of the shift sense relative to the reference. In essence, then, the conventional discriminator may be thought of as an analog device wherein smooth variations in an output potential about zero are representations of the magnitude and direction of a frequency deviation.

Although the customary discriminator circuit is relatively inexpensive, reliable and well suited in numerous equipments, difficulties are encountered in attempting its application where precise, analytical data are essential. This problem is perhaps best illustrated by an example. Assume that the reference frequency is of the order of 500 kcs. If the incoming signal departs from this reference by several thousand cycles per second, a substantial positive or negative direct potential will be provided at the output. As the frequency deviation is diminished, the reduction of output potential follows linearly until an ambiguous range of relatively small deviation is reached, where due to the inherent limitations of a tuned circuit, it is not possible to distinguish between frequencies above or below the reference. This range may not be too accurately defined, since it is dependent upon the quality of the discriminator resonant circuit and associated components. But it is sufficient to state that with a 500 kcs. reference, it is not possible to provide a direct potential of correct sign which is linearly the analog of a frequency deviation of one cycle per second. Additionally, it should be mentioned that even if it were possible to generate an accurate potential representation, the amplitude thereof would be insignificantly small for slight frequency shifts, and would therefore impose the requirement of sensitive direct coupled amplifiers in the equipment following the discriminator.

2

The need for sensitive and quantitative frequency shift detection circuits arises frequently in connection with data processing systems. Consider as a typical example, a continuous wave radar system arranged to compute continuously the position of some moving target on the basis of received Doppler frequency shift. Computation clearly involves utilization of both magnitude and sign of the return frequency deviation from the transmitted signal. If the radial target velocity is high, then both these quantities are readily discernible even with conventional circuits. However, if the target should hover near zero velocity and reverse direction frequently, no computer would be capable of handling the ambiguous data that prior available circuits would furnish.

The present invention contemplates and has as a primary object the provision of electrical apparatus capable of furnishing a signal precisely related to the magnitude of the difference between two frequencies while continuously and unambiguously indicating the sense of the shift, all without limitation as to shift magnitude even in the region of infinitesimal deviation.

It is another object of the present invention to provide frequency shift detection apparatus through the novel adaptation of digital techniques whereby the output thereof is directly available for further processing in a digital computer.

Broadly speaking, the circuit herein disclosed simultaneously combines the input with phase shifted components of the reference to yield control signals that are applied to a pair of gate circuits in a manner whereby only one will pass a sign determinative signal. The latter signal sets a bistable circuit in one of the two possible conductive states to indicate the sense of the frequency shift relative to the reference in binary notation. The extent of the frequency shift is indicated by a pulse train of proportional frequency which may readily be counted by established binary circuits or otherwise used for digital computation.

A further object of the present invention is therefore to provide apparatus for electrically indicating in binary form the sign of signal frequency deviation relative to a reference.

A still further object of this invention is to provide a detector for comparing frequencies and yielding an indication of difference in digital form.

These and other objects and advantages of the present invention will become more apparent from the following detailed specifications with reference to the accompanying drawing, in which.

Figure 1:
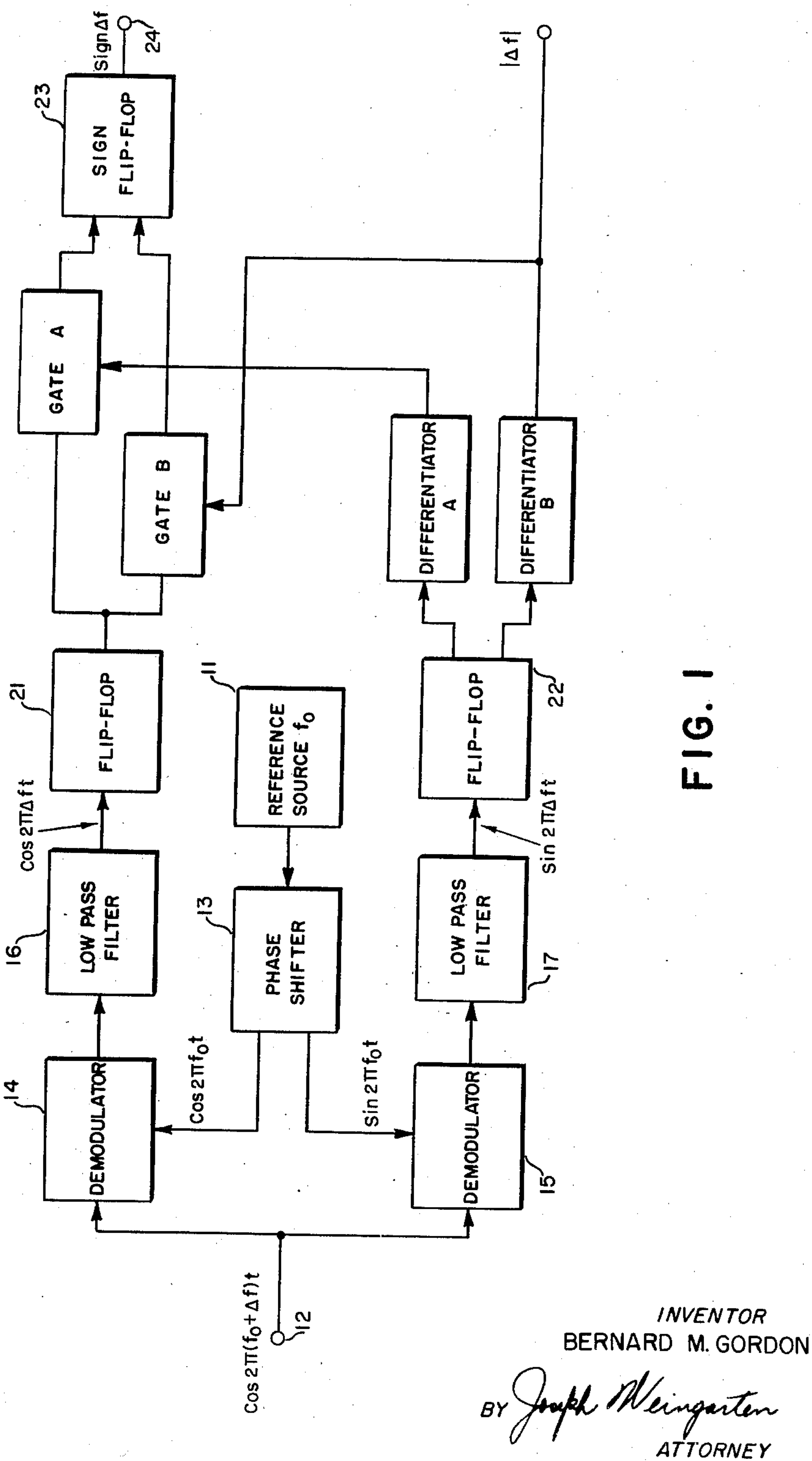
Fig. 1 is a generalized block diagram illustrating the combination of components, functionally identified, comprising an embodiment of the digital frequency deviation detector.

With reference now to the drawing and more particularly to Fig. 1 thereof, the general organization of key circuit elements will be described, and this will be followed by an analysis of an actual circuit arrangement capable of realizing the various advantages of the inventive concepts herein covered.

A reference source 11 furnishes a continuous signal at the reference frequency, designated as $f_0$. It will be seen that there is fundamentally no limitation to this frequency, and it may be furnished by a stable local oscillator; or if the system is incorporated in the aforementioned Doppler radar, the reference source may be taken as a signal related in frequency to that of the transmitted signal.

The input signal under examination is applied to the circuit at terminal 12, and is of a frequency $f_0 \pm \Delta f$, where $\Delta f$ represents deviation from the reference. For convenience in setting forth the inventive principles it will be first assumed that $\Delta f$ is positive, that is to say, the incoming frequency is greater than the reference.

For indicating the relative phase and frequency, the various potentials have been designated by trigonometric functions on the drawing. Thus, the input signal is arbitrarily taken as:

$$\cos 2\pi(f_0+\Delta f)t$$

the signal amplitude being omitted as immaterial to this discussion.

The reference signal is applied to a dual phase shifting network 13, from which are derived two reference signals in phase quadrature, herein designated as $\cos 2\pi f_0 t$ and $\sin 2\pi f_0 t$; and these are in turn applied to demodulators 14 and 15, respectively, together with the input signal from terminal 12. The difference frequencies are selected from the modulator outputs by low pass filters 16 and 17 to provide signals whose phase relationship is indicated by the functions $\cos 2\pi\Delta ft$ and $\sin 2\pi\Delta ft$, respectively, since $\Delta f$ has been considered positive. These signals are sinusoids in phase quadrature at the deviation frequency, the magnitude and sign of which are to be precisely indicated.

At this point, the signals are respectively applied to a pair of switching circuits designated as flip-flops 21 and 22, which are essentially bistable circuits, also known as toggle flip-flops, and are each triggered, and thus reversed, once during each half cycle of the signal at frequency $\Delta f$. In effect, each flip-flop at its output squares the waveforms applied thereto.

The signal outputs of the flip-flops are used somewhat differently. Flip-flop 21 as energized by the cosine signal is used to excite gate circuits A and B in parallel for one half cycle during each full cycle of the flip-flop output. Two outputs, 180 degrees out of phase and representing the two available stable states, are taken from flip-flop 22 and are processed in differentiators A and B, to provide two output pulse trains which are applied to the A and B gates, respectively.

By virtue of the circuit organization and the phase relationships therein established, either gate A or gate B, but not both, will pass differentiator output pulses to the sign flip-flop 23, which in the stable state assumed will indicate at terminal 24 the sense, or sign, of the frequency deviation $\Delta f$ relative to the reference $f_0$. At terminal 25 a pulse train, equal in frequency to the actual deviation, will indicate the magnitude of $\Delta f$ in digital form.

The block diagram of Fig. 1 is intended only to show the logical arrangement and interconnection of salient circuit elements, and no attempt will be made at this point to describe actual system operation. Thorough analysis will be advanced during treatment of Figs. 2 and 3.

Figure 2:
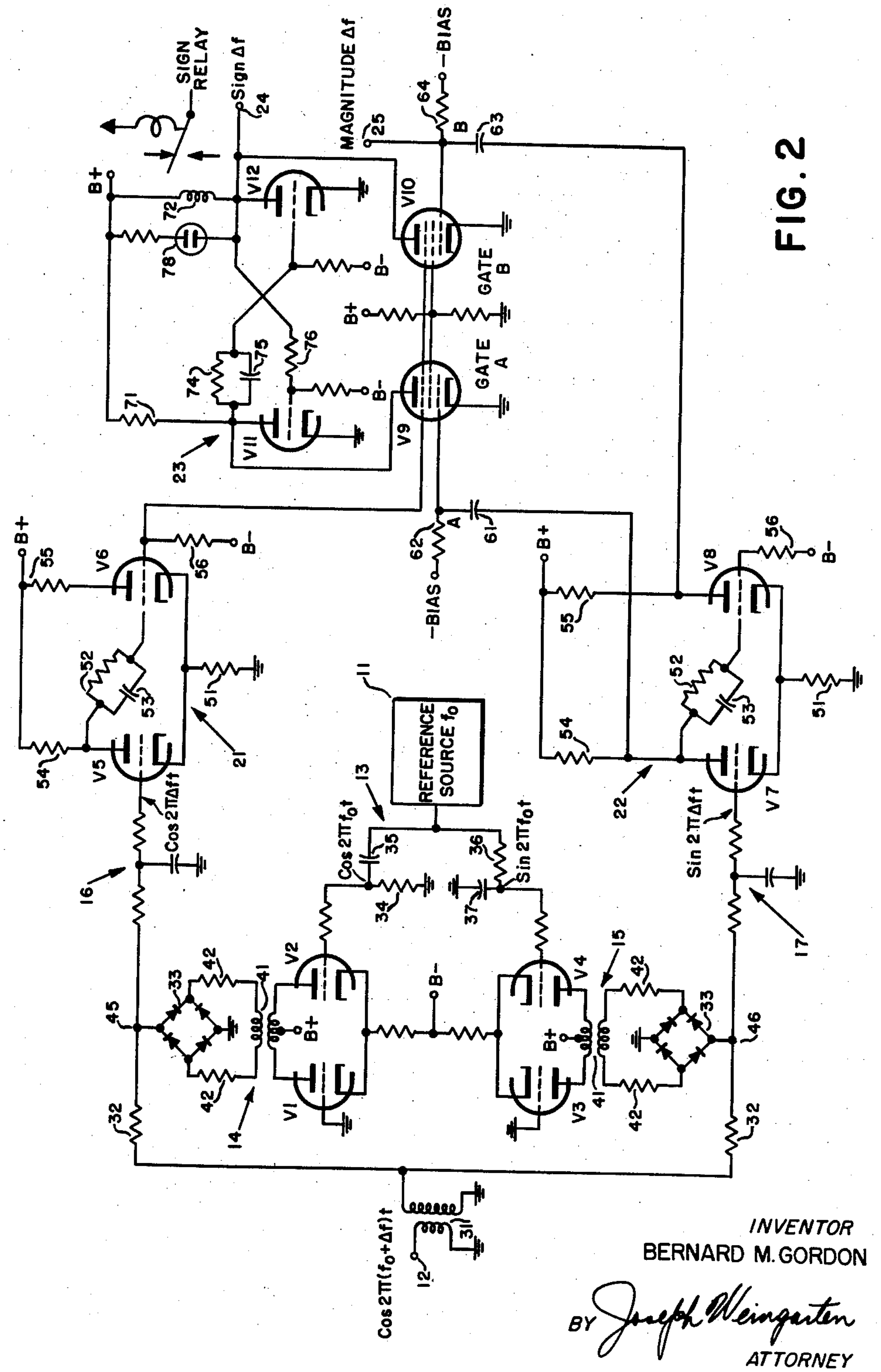
Fig. 2 is a schematic circuit diagram of the system generally illustrated in Fig. 1.

With reference now to Fig. 2 there is shown a schematic diagram of the frequency sensitive circuit of Fig. 1. For assistance in establishing consistent relationships among the elements of Figs. 1 and 2, like reference numerals have been used wherever applicable.

Specifically, the input signal designated by the trigonometric function $\cos 2\pi(f_0+\Delta f)t$ is applied to a coupling transformer 31 at terminal 12, and from the output thereof simultaneously applied to two similarly constituted balanced demodulators or signal mixers 14 and 15. Each demodulator includes an input load impedance, namely resistor 32, joined to a balanced diode bridge grounded at the junction opposite connection to resistor 32. Diode bridges 33 are also energized from reference source 11 at frequency $f_0$, as follows: The output of reference source 11 is applied to the phase shifter 13 which includes two parallel networks, the first being formed of resistor 34 and capacitor 35, and the second of resistor 36 and capacitor 37. The output of the first of these networks is taken from resistor 34 while the output of the second network is taken across capacitor 37, and these are applied to the control grids of triodes V2 and V4, respectively. Clearly, by suitable selection of the values of resistors and capacitors in the phase shifter 13, the potential applied to the control grid of V2 may be arranged to lead the potential applied to the control grid of V4 by 90°. This quadrature relationship is expressed on the drawing by designating the input potential to tube V2 as $\cos 2\pi f_0 t$ and the potential input to the control grid of tube V4 as $\sin 2\pi f_0 t$.

Tubes V1 and V2, and tubes V3 and V4, comprise two differential amplifiers. In each pair the cathodes are connected in parallel and resistively returned to a suitable negative power source B−, while the plates are symmetrically connected to a positive power source B+ through the center tap in the primary of output transformer 41. The secondaries of transformers 41 are connected to the diode rectifier bridges through resistors 42, all of equal magnitude. The control grids of tubes V1 and V3 are grounded. In all physical respects, demodulators 14 and 15 are identical; electrically, the reference frequency drive to the inputs are shifted in phase.

The simultaneous application to demodulators 14 and 15 of each of two signals differing in frequency results in outputs at junctions 45 and 46 which include signals at the difference frequency. These difference signals are selected by simple resistance-capacitance low-pass filters 16 and 17 and delivered to the inputs of flip-flops 21 and 22. Note that the relative phase and frequency relationships are retained through the demodulation process, and thus the difference frequencies may be expressed, as shown on the drawing, by the functions $\cos 2\pi\Delta ft$ and $\sin 2\pi\Delta ft$, where $\Delta f$ represents a positive frequency shift.

At this point, the generally symmetrical nature of the circuit is at an end. Directing attention now to flip-flop 21, this circuit is seen to be formed of a pair of triodes V5 and V6, intercoupled by a common cathode connection returned to ground through cathode resistor 51, and further by the parallel network of resistor 52 and capacitor 53 which joins the plate of V5 to the control grid of V6. The plates of these tubes are symmetrically returned to B+ through load resistors 54 and 55. The control grid of tube V6 is connected to the negative source B− through comparatively high resistor 56. Flip-flop circuit 21 is characterized by two stable states manifested by conduction of one or the other of triodes V5 and V6.

Quiescently, due to the relatively high bias applied to its control grid, tube V6 is cut off while tube V5 conducts. The application of a sufficiently large negative potential to the control grid of V5 will cut this tube off, with a consequent rise in plate voltage. The action of coupling circuit 52—53 will correspondingly increase the grid potential of tube V6 to initiate conduction therein. The state of conduction will be reversed when a sufficiently large positive potential is applied to the control grid of tube V5 so as to reinitiate conduction therein.

Figure 3:
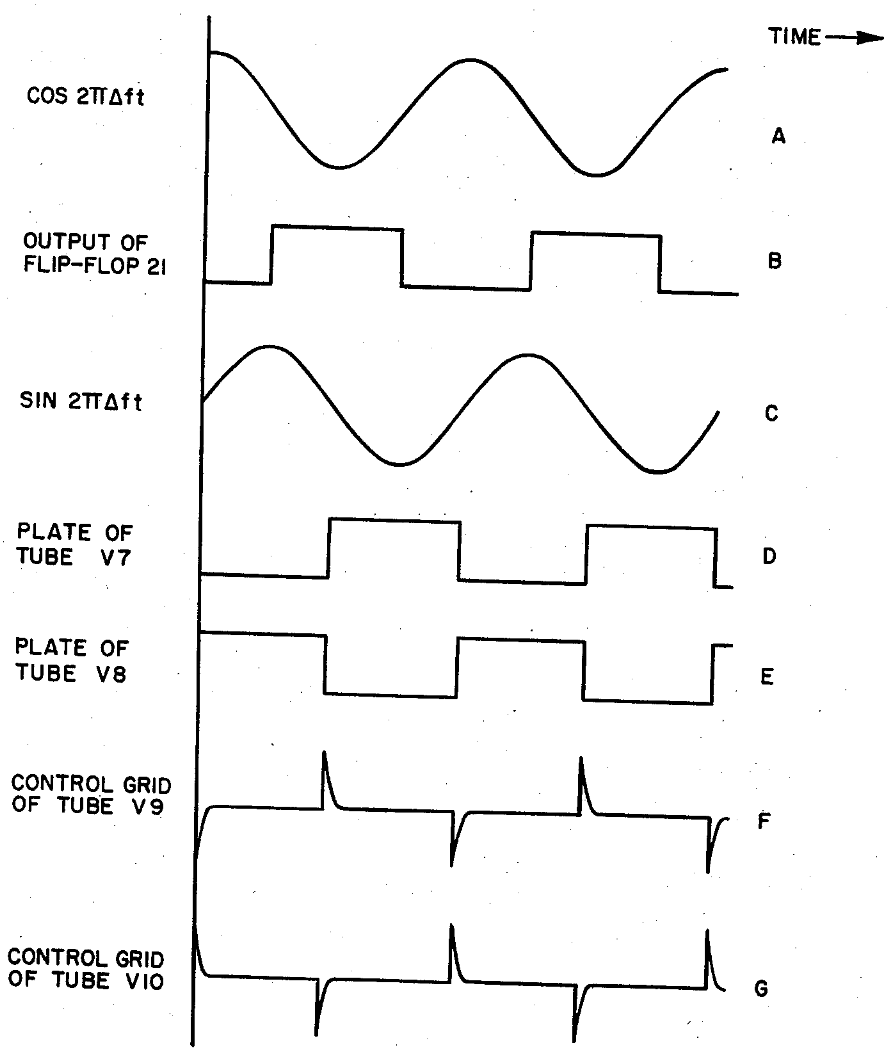
Fig. 3 is a graphical representation of the potential waveforms generated at selected points within the system of Figs. 1 and 2, all plotted on a common time axis, and of assistance in demonstrating the principles of circuit operation.

In Fig. 3–A there is shown the cosinusoidal waveform at the difference frequency $\Delta f$ applied to the control grid of triode V5. Irrespective of its frequency, each negative half cycle will cut off tube V5 to initiate conduction in tube V6, while each positive half cycle thereof will result again in conduction of tube V5 and cut off in tube V6.

The output of flip-flop 21 is taken from the control grid of tube V6 and will constitute simply a square wave at the applied difference frequency $\Delta f$, as is shown in Fig. 3–B. This square wave is applied directly to the suppressor grids of pentodes V9 and V10 which constitute gate generators A and B, respectively.

From an inspection of the drawing, it will be evident that flip-flop 22, formed of triodes V7 and V8, is substantially identical in design and in operation to flip-flop 21. Two outputs of opposite phase, however, are taken, one from the plate of tube V7 and one from the plate of tube V8 and these are applied respectively through differentiator A formed of capacitor 61 and resistor 62, and differentiator B formed of capacitor 63 and resistor 64, to the control grids of gate circuit pentodes V9 and V10. Resistors 62 and 64 in the differentiators are returned to suitable negative potential sources to provide the operating biases for the control grids of the gate generators.

In Fig. 3–C there is shown the waveform sin $2\pi\Delta ft$ as applied to the control grid of flip-flop triode V7, and it is seen that this voltage lags that shown in Fig. 3–A by 90°. During positive half cycles of this sine wave, tube V7 will conduct while during negative half cycles, tube V8 will conduct, and consequently, the outputs at the tube plates are respectively square waves as shown in Figs. 3–D and 3–E, similar in waveform but one half cycle out of phase. By virtue of the action of the differentiating circuits, the signals applied to the control grids of gate generators V9 and V10 will be essentially the bipolar pulse waveforms shown in Fig. 3–F and 3–G, respectively.

Returning to the physical structure of the gate generator, it will be noted that the plate of V9 is coupled to the positive potential source B+ through a load resistor 71 which is common to the plate circuit of tube V11. The plate of pentode V10 is connected to B+ through the plate load common to triode V12 which, in this instance, is the coil of relay 72. The cathodes of both tubes are grounded, and a suitable positive potential is applied to the screen grids. Gate circuits A and B operate as coincidence circuits; that is with the fixed bias applied to the control grids of pentodes V9 and V10, neither tube will conduct unless positive signals coincidently appear at the control and suppressor grids.

Triodes V11 and V12 comprise the sign flip-flop 23. Both control grids are resistively returned to the negative source B− and are cross coupled to the tube plates through the parallel combination of resistor 74 and capacitor 75 and through resistor 76. The sign flip-flop 23 is actuated through the gate circuit arrangement by virtue of the mutual coupling afforded by the common plate impedances in the form of resistor 71 and the resistance of the coil of relay 72.

With the physical characteristics of this novel circuit in view, the operation thereof may now be considered in detail. With the input frequency at terminal 12 greater than the reference frequency by an amount $\Delta f$, the phase relationships of the system will be as indicated by the trigonometric functions in Figs. 1 and 2, and in the graphical display of Fig. 3. During each negative half cycle of the signal cos $2\pi\Delta ft$ as applied to the control grid of tube V5, the output of flip-flop 21 will comprise a fixed positive potential, which as coupled to the suppressor grids of pentodes V9 and V10 activates gates A and B. Because of the quadrature relationship between signals at the control grids of tubes V5 and V7, the positive differentiator output pulses shown in Fig. 3–F are applied to the control grid of pentode V9 while the suppressor grids are positive. The control grid of tube V10 will be driven by negative pulses during this period.

The coincident application of positive signals to the suppressor and control grids of pentode V9 will cause conduction in pentode V9, with current flow through resistor 71 and a consequent potential drop at the plate of V11. Through coupling network 74—75 tube V12 will be cut off to de-energize relay 72 whereby its contacts will be in the position shown. Triode V11 of flip-flop 23 will conduct and since conduction of V11 with non-conduction of V12 is a stable state, these conditions will prevail even when pentode V9 ceases to conduct. Negative signals applied to the control grid of pentode V10 will not pass through gate B to alter the status of flip-flop 23.

Relay 72 will remain de-energized as long as the input frequency is larger than the reference, and it is of no consequence that this positive frequency shift varies in magnitude. This is true because the only effect of a variation of magnitude in frequency $\Delta f$ is to change the time duration of the particular control waveforms illustrated in Fig. 3 without effect on the relative phase thereof. Once the sign flip-flop 23 is set by a signal through gate A, subsequent positive pulses applied to the plate of V11 will have no further triggering effect.

If now the frequency applied at terminal 12 falls below the reference frequency $f_0$, that is, $\Delta f$ becomes negative; the input at terminal 12 will be cos $2\pi(f_0-\Delta f)t$, and the two modulator outputs become cos $(-2\pi\Delta f)t$ and sin $(-2\pi\Delta f)t$. But note that the two last-named signals are respectively equal to cos $2\pi\Delta ft$ and −sin $2\pi\Delta ft$. Physically then, the signal applied to the control grid of triode V5 will remain relatively fixed in phase irrespective of the sign of the difference frequency $\Delta f$, while the sine signal component as applied to triode V7 will shift one half cycle, or 180°, when the input frequency falls below the reference. The control grid of gate pentode V9 will now be energized by negative pulses when its suppressor grid is positive while the control and suppressor grids of pentode V10 will be coincidently energized by positive signals. Pentode V10 will conduct and thereby lower the plate voltage of triode V12, to trigger the flip-flop so that V12 conducts while V11 is cut off. Under these circumstances, sign relay 72 will be energized and the contact position thereof reversed. While the sense of the frequency shift remains negative, this stable state of conduction and non-conduction in flip-flop 23 will be maintained, and as above discussed in relation to positive frequency shifts, this condition will not be affected by the magnitude of the frequency deviation.

The particular value and novelty of establishing the quadrature relations at the reference frequency is at once evident. Since the relative phase of the signals cos $2\pi(\pm\Delta f)t$ is invariant, while the signal sin $2\pi(-\Delta f)t$ is a full half cycle displaced from sin $2\pi(+\Delta f)t$ unusual sensitivity is available. The status of flip-flop 23 will unambiguously indicate the shift sense of a frequency infinitesimally displaced from the reference. Further, whatever the selected reference $f_0$, the remainder of the circuit, including the resistance-capacitance phase shift network, is wholly frequency insensitive.

Relay 72 and its associated contacts have been discussed as the means for obtaining shift sense information. However, this was for example only, and other means are readily available. Thus, neon bulb 78 will light whenever tube V12 conducts, and will be extinguished whenever V12 is cut off. The potential waveform at the plate of triode V12, as it appears at output terminal 24 also defines the shift sense. Here the potential will fall when V12 conducts, to indicate negative frequency shift. The potential drop magnitude will be unrelated to frequency shift magnitude. Signals taken from the plates of both V11 and V12 will directly provide a binary notation of shift sense; thus, (−+) will denote $\Delta f$ positive and (+−) will denote $\Delta f$ negative, respectively.

The pulse trains appearing at the differentiator outputs are as noted above, at the frequency $\Delta f$. Taking one of these trains at terminal 25 affords a convenient means of measuring frequency difference. For example, through the use of well known pulse counters, decimal or binary, the magnitude of $\Delta f$ is readily noted.

The present invention of course is ideally suited for furnishing data to a digital computer. Note that the frequency deviation magnitude is represented by a proportional digital pulse train, while a direct binary indication is available for setting computer operation in the appropriate manner.

The obvious advantages of this novel circuit in frequency calibration against a standard, and in automatic frequency control should be noted, although it will be apparent that its utility is general wherever extreme reliability is paramount.

With the invention described as embodied in a particular form, it will be apparent that numerous modifications and departures may now be made by those skilled in this electrical art. Consequently, the invention herein is to be construed as limited only by the spirit and scope of the appended claims.

What is claimed is:

1. Apparatus for indicating the relation between first and second signal frequencies comprising, means for combining said first signal with phase shifted components of said second signal to provide a plurality of control signals, a switch circuit, and selective means for applying only one of said control signals to said switch circuit.

2. Apparatus for establishing the relationship between an input signal frequency and a reference signal frequency comprising, means for combining said input and reference signals to provide a first signal of relatively invariant phase and a second signal capable of assuming only either of two possible relative phases, a bistable circuit, and means responsive to said first and second signals for triggering said bistable circuit only upon change of said second signal from one to the other of said two possible phases.

3. Apparatus for indicating the relationship between first and second signal frequencies comprising, means for mixing said first signal with quadrature components of said second signal to provide quadrature signals of difference frequency, means for translating one of said difference frequency signals into a square wave of corresponding frequency, means for translating the other of said difference frequency signals into pulse trains of corresponding frequency, a bistable circuit, and a gate circuit responsive to said square wave for coupling a predetermined pulse train to said bistable circuit.

4. Frequency sensitive apparatus for comparing an input signal with a reference signal comprising, means for deriving a pair of quadrature components of said reference signal, means for separately mixing each of said quadrature components with said input signal to provide a pair of quadrature signals at difference frequency, means for squaring the waveform of the first of said difference frequency signals, means for deriving a pair of phased pulse signals from the second of said difference frequency signals, gating means for comparing relative polarities of said square waveform and said pulse signals, and means actuated in response to said gating means for indicating said relative polarities thereby furnishing information on the relative magnitudes of said input signal and said reference signal.

5. Apparatus for indicating the magnitude and sense of the frequency deviation of an input signal from a reference signal comprising, means for mixing said signals to provide a pair of quadrature signals at the difference frequency, a first bistable circuit for squaring the waveform of one of said pair, a second bistable circuit for squaring the waveform of the second of said quadrature pair, means for differentiating the output of said second bistable circuit for providing a pair of pulse signals of relatively opposite phase, gating means simultaneously energized by the outputs of said first bistable circuit and said differentiating means and providing output pulse signals, and means actuated by said last-mentioned pulse signals for indicating continuously the sense of said frequency deviation, the output of said differentiating means being indicative of the magnitude of said deviation.

6. A frequency discriminator for providing signals indicative of the magnitude and sense of the frequency deviation of an input signal from a reference signal comprising, means for deriving first and second substantially sinusoidal signals in phase quadrature at the difference frequency, a first bistable circuit energized by said first signal for providing a gate signal of alternating polarity at said difference frequency, a second bistable circuit energized by the second of said signals for providing two square waves of opposite phase, means for differentiating said square waves to provide first and second pulse trains of opposite phase and indicating the magnitude of said frequency deviation, first and second coincidence gate circuits, means for coupling said gate signal to said first and second gate circuits in parallel, means for applying said first pulse train to said first gate circuit and means for applying said second pulse train to said second gate circuit, and a third bistable circuit coupled to said gate circuits and responsive to output pulses therefrom whereby the stable state assumed is representative of sense of said frequency deviation.

7. A frequency discriminator for providing signals indicative of the magnitude and sense of the frequency deviation of an input signal from a reference signal comprising, means for deriving first and second substantially sinusoidal signals in phase quadrature at the difference frequency, first and second bistable circuits energized respectively by said first and second difference frequency signals, means for differentiating the output of said second bistable circuit, a third bistable circuit, and gating means responsive to coincidence of polarities in the outputs of said first bistable circuit and said differentiating means for triggering said third bistable circuit.

8. A frequency discriminator providing signals indicative of the magnitude and sense of the frequency deviation of an input signal from a reference signal comprising, means for deriving first and second substantially sinusoidal signals in phase quadrature at the difference frequency, a first bistable circuit energized by said first signal for providing a gate signal of alternating polarity at said difference frequency, a second bistable circuit energized by the second of said signals for providing two square waves of opposite phase, means for differentiating said square waves to provide first and second pulse trains of opposite phase and indicating the magnitude of said frequency deviation, first and second coincidence gate circuits, means for coupling said gate signal to said first and second gate circuits in parallel, means for applying said first pulse train to said first gate circuit and means for applying said second pulse train to said second gate circuit, and a third bistable circuit comprised of first and second electron tubes respectively coupled to said first and second gate circuits and responsive to output pulses therefrom to assume a stable state of conduction of said first tube and non-conduction of the second when said frequency deviation is positive and a stable state of non-conduction of said first tube and conduction of the second when said frequency deviation is negative.

9. A frequency discriminator for providing signals indicative of the magnitude and sense of the frequency deviation of an input signal from a reference signal comprising, means for deriving first and second substantially sinusoidal signals in phase quadrature at the difference frequency, first and second coincidence gate circuits, means for deriving a gate signal from said first difference frequency signal for application to said gate circuits in phase, means for deriving first and second oppositely phased signals from said second difference frequency signal for application to said first and second gate circuits respectively, and means for indicating coincidence in said gate circuits.

10. A frequency sensitive circuit for continuously furnishing digital information respecting the magnitude and sign of the frequency deviation of an input signal from a reference signal comprising, a phase shift circuit for continuously providing first and second signals in phase quadrature at said reference signal frequency, first and second demodulators respectively energized by said first and second quadrature signals, means for applying said input signal to said first and second demodulators in phase, the outputs of said demodulators including first and second difference frequency signals in phase quadrature, a first flip-flop circuit energized by said first difference frequency signal and providing a square wave output of equal frequency, a second flip-flop circuit energized by said second difference frequency signal and providing second and third square waves oppositely phased with respect to each other and in phase quadrature with said first square wave, means for differentiating said second and third square waves to provide first and second oppositely phased pulse trains each in phase quadrature with respect to said first square wave, first and second coincidence gate circuits, means for applying said first square wave to said gate circuits in phase, means for applying said first and second pulse trains to said first and second coincidence gate circuits respectively, each of said gate circuits being responsive to a predetermined polarity coincidence of said applied signals for passing the respective pulse train applied thereto, and a third flip-flop circuit responsive to the pulse train outputs of said coincidence gate circuits.

11. A frequency sensitive circuit for continuously furnishing digital information respecting the magnitude and sign of the frequency deviation of an input signal from a reference signal comprising, a phase shift circuit for continuously providing first and second signals in phase quadrature at said reference signal frequency, first and second demodulators respectively energized by said first and second quadrature signals, means for applying said input signal to said first and second demodulators in phase, the outputs of said demodulators including first and second difference frequency signals in phase quadrature, a first flip-flop circuit energized by said first difference frequency signal and providing a square wave output of equal frequency, a second flip-flop circuit energized by said second difference frequency signal and providing second and third square waves oppositely phased with respect to each other and in phase quadrature with said first square wave, means for differentiating said second and third square waves to provide first and second oppositely phased pulse trains each in phase quadrature with respect to said first square wave, first and second coincidence gate circuits, means for applying said first square wave to said gate circuits in phase, means for applying said first and second pulse trains to said first and second coincidence gate circuits respectively, each of said gate circuits being responsive to a predetermined polarity coincidence of said applied signals for passing the respective pulse train applied thereto, and a third flip-flop circuit including first and second electron tubes mutually coupled to said first and second coincidence gates respectively and arranged whereby the stable state assumed is determined by the coincidence gate passing an applied pulse train.

12. Apparatus as in claim 10 wherein said first and second coincidence gates include first and second multigrid electron tubes respectively and wherein said third flip-flop circuit is formed of third and fourth electron tubes having plate load impedances common to said first and second electron tubes respectively.

13. Apparatus for indicating the relationship between first and second signal frequencies comprising, means for mixing said first signal with phase displaced components of said second signal to provide phase displaced signals of difference frequency, means for translating one of said difference frequency signals into a square wave of corresponding frequency, means for translating the other of said difference frequency signals into pulse trains of corresponding frequency, a bistable circuit, and a gate circuit responsive to said square wave for coupling a predetermined pulse train to said bistable circuit.

References Cited in the file of this patent

UNITED STATES PATENTS

| | | |
|---|---|---|
| 2,176,742 | La Pierre | Oct. 17, 1939 |
| 2,304,134 | Wirkler | Dec. 8, 1942 |
| 2,441,969 | Lehmann | May 25, 1948 |
| 2,522,139 | Schoenbaum | Sept. 12, 1950 |
| 2,530,387 | Goetz | Nov. 21, 1950 |
| 2,561,182 | Crane | July 17, 1951 |
| 2,594,535 | Betram | Apr. 29, 1952 |
| 2,644,133 | Soukaras | June 30, 1953 |
| 2,677,758 | Robinson et al. | May 4, 1954 |